US008461290B2

(12) United States Patent
Carpentier et al.

(10) Patent No.: US 8,461,290 B2
(45) **Date of Patent: *Jun. 11, 2013**

(54) MONOMERS ISSUED FROM RENEWABLE RESOURCES AND PROCESS FOR POLYMERISING THEM

(75) Inventors: Jean-François Carpentier, Acigne (FR); Sophie Guillaume, Vitré (FR); Marion Helou, Rennes (FR); Yann Sarazin, Acigne (FR); Olivier Miserque, Mont-Saint-Guibert (BE)

(73) Assignees: Total Petrochemicals Research Feluy, Seneffe (Feluy) (BE); Centre National de la Recherche Scientifique (CNRS), Paris (FR)

( * ) Notice: Subject to any disclaimer, the term of this patent is extended or adjusted under 35 U.S.C. 154(b) by 222 days.

This patent is subject to a terminal disclaimer.

(21) Appl. No.: 12/919,537

(22) PCT Filed: Feb. 17, 2009

(86) PCT No.: PCT/EP2009/051870

§ 371 (c)(1), (2), (4) Date: Jan. 4, 2011

(87) PCT Pub. No.: WO2009/106460

PCT Pub. Date: Sep. 3, 2009

(65) Prior Publication Data

US 2011/0092664 A1 Apr. 21, 2011

(30) Foreign Application Priority Data

Feb. 26, 2008 (EP) .................................... 08290187

(51) Int. Cl.

| | |
|---|---|
| ***C08G 64/30*** | (2006.01) |
| ***C08G 64/02*** | (2006.01) |
| ***C08K 5/56*** | (2006.01) |

(52) U.S. Cl.

USPC ........... 528/371; 549/228; 549/372; 502/158; 502/167; 502/171; 502/200; 502/343; 502/152

(58) Field of Classification Search

USPC ........................... 549/228, 372; 528/370, 371

See application file for complete search history.

(56) References Cited

U.S. PATENT DOCUMENTS

| | | | | |
|---|---|---|---|---|
| 4,894,464 | A * | 1/1990 | Brennan et al. | 549/88 |
| 6,025,504 | A | 2/2000 | Claude et al. | |
| 6,316,590 | B1 * | 11/2001 | Coates et al. | 528/357 |

FOREIGN PATENT DOCUMENTS

| | | | |
|---|---|---|---|
| WO | 0164771 | A2 | 9/2001 |

OTHER PUBLICATIONS

Pego et al (Physical properties of high molecular weight 1,3-trimethylene carbonate and D,L-lactide copolymers, Journal of Materials Science: Materials in Medicine 14 (2003) 767-773).*

"Polymers of Carbonic Acid", Author: Hans Kricheldorf, Macromolecular Chemistry and Physics vol. 201, Dec. 12, 2000, pp. 2557-2565, XP002499564.

Bhanage et al., "Transesterification of Urea and Ethylene Glycol to Ethylene Carbonate as an Important Step for Urea Based Dimethyl Carbonate Synthesis," Green Chemistry, 2003, vol. 5, pp. 429-432.

(Continued)

*Primary Examiner* — Randy Gulakowski
*Assistant Examiner* — Rachel Kahn

(57) ABSTRACT

This invention relates to the synthesis of polycarbonates prepared from carbonate monomers derived from the biomass in the presence of a system comprising an organometallic transfer agent and alcohol. It also relates to the polymers resulting from these cyclic compounds.

10 Claims, 2 Drawing Sheets

70000
60000
50000
40000
30000
20000
10000
0
Mn
0 20 40 60 80 100 120
conv(%)
BnOH
iPrOH

OTHER PUBLICATIONS

Wang et al., "Synthesis and Characterization of Novel Aliphatic Polycarbonates," Journal of Polymer Science: Part A: Polymer Chemistry, 2002, vol. 40, pp. 70-75.
Wolinsky et al., "Poly(carbonate ester)s Based on Units of 6-Hydroxyhexanoic Acid and Glycerol," Macromolecules, 2007, vol. 40, pp. 7065-7068.
Aresta et al., "A Study on the Carboxylation of Glycerol to Glycerol Carbonate with Carbon Dioxide: The Role of the Catalyst, Solvent and Reaction Conditions," Journal of Molecular Catalysis A: Chemical 257, 2006, pp. 149-153.
Rokicki et al., "Hyperbranched Aliphatic Polyethers Obtained from Environmentally Benign Monomer: Glycerol Carbonate," Green Chemistry, 2005, vol. 7, pp. 529-539.
Ubaghs et al., "Polyurethanes with Pendant Hydroxyl Groups: Synthesis and Characterization," Macromolecular Rapid Communications, 2004, vol. 25, pp. 517-521.
Komura et al., "Synthetic Studies by the Use of Carbonates. II. An Easy Method of Preparing Cyclic Carbonates of Polyhydroxy Compounds by Transesterification with Ethylene Carbonate," Bulletin of the Chemical Society of Japan, 1973, vol. 46, pp. 550-553.
Matsumoto et al., "Preparation of Optically Active Diol Derivatives by the Enzymatic Hydrolysis of Cyclic Carbonates," Bulletin of the Chemical Society of Japan, 1996, vol. 69, No. 10, pp. 2977-2987.
Kricheldorf et al., Polymers of Carbonic Acid 29. Bu2SnOct2—Initiated Polymerizations of Trimethylene Carbonate (TMC, 1,3-dioxanone-2), Polymer, 2000, vol. 41, pp. 7311-7320.
Darensbourg et al., "Biometal Derivatives as Catalysts for the Ring-Opening Polymerization of Trimethylene Carbonate. Optimization of the Ca(II) Salen Catalyst System," Macromolecules, 2006, vol. 39, pp. 4374-4379.
Dobrzinski et al., "Less Toxic Acetylacetonates as Initiators of Trimethylene Carbonate and 2,2-Dimethyltrimethylene Carbonate Ring Opening Polymerization," Journal of Polymer Science: Part A: Polymer Chemistry, 2005, vol. 43, pp. 1913-1922.
Kuran et al., "New Route to Oligocarbonate Diols Suitable for the Synthesis of Polyurethane Elastomers," Polymer 2000, vol. 41, pp. 8531-8541.
Palard et al., "Unprecedented Polymerization of Trimethylene Carbonate Initiated by a Samarium Borohydride Complex: Mechanistic Insights and Copolymerization with •—Caprolactone," Chem. Eur. J., 2007, vol. 13, pp. 1511-1521.
Zhao et al., Ring-Opening Polymerization of Trimethylenecarbonate and Its Copolymerization with •—Caprolactone by Lanthanide (II) Aryloxide Complexes, 2007, Journal of Applied Polymer Science, vol. 106, pp. 1383-1389.
Sheng et al., "Anionic Lanthanide Phenoxide Complexes as Novel Single-Component Initiators for the Polymerization of •—Caprolactone and Trimethylene Carbonate," Journal of Polymer Science: Part A: Polymer Chemistry, 2007, vol. 45, pp. 1210-1218.
Bisht et al., "Lipase-Catalyzed Ring-Opening Polymerization of Trimethylene Carbonate," Macromolecules, 1997, vol. 30, pp. 7735-7742.
Gross et al., "Polymer Synthesis by In Vitro Enzyme Catalysis," Chemical Reviews, 2001, vol. 101, No. 7, pp. 2097-2124.
Kobayashi et al., "Enzymatic Polymerization," Chemical Reviews, 2001, vol. 101, No. 12, pp. 3793-3818.
Nederberg et al., "Organocatalytic Ring Opening Polymerization of Trimethylene Carbonate," Biomacromolecules, 2007, vol. 8, No. 1, pp. 153-160.
Mindemark et al., "End-Group-Catalyzed Ring-Opening Polymerization of Trimethylene Carbonate," Macromolecules, 2007, vol. 40, No. 10, pp. 3515-3517.
Chamberlain et al., Polymerization of Lactide with Zinc and Magnesium β-Diiminate Complexes: Stereocontrol and Mechanism, Journal of American Chemical Society, 2001, vol. 123, No. 14, pp. 3229-3238.

* cited by examiner

MONOMERS ISSUED FROM RENEWABLE RESOURCES AND PROCESS FOR POLYMERISING THEM

CROSS-REFERENCE TO RELATED APPLICATIONS

This application claims the benefit of PCT/EP2009/051870, filed Feb. 17, 2009, which claims priority from EP 08290187.7, filed Feb. 26, 2008.

This invention relates to the synthesis of polycarbonates prepared from cyclic monomers derived from the biomass in the presence of a system comprising an organometallic catalyst and a transfer agent. It also relates to the resulting polymers of cyclic monomer.

Several methods have been developed to prepare polycarbonates. The starting material is selected either from a five- or from a six-membered carbonate monomer. There is an abundant literature describing the synthesis of these compounds. The synthesis of six-membered carbonates is described for example in Bhanage et al. (Bhanage B. M. Fujita S., Ikushima Y., Arai M., in Green Chemistry, 5, 429, 2003), or in Wang et al. (Wang X. L., Zhuo, R. X., Liu L. J., He F., Liu G., in J. Polym. Sci. Part A. 40, 70, 2002), or in Wolinsky et al. (Wolinsky J. B., Ray III W. C., Colson Y. L., Grinstaff M. W., in Macromolecules, 40, 7065, 2007, or in Gasset et at (EP-A-0, 955,298).

The synthesis of five-membered carbonates is described for example in Aresta and Dibenedetto (Aresta M., Dibenedetto A., J. Mol. Catal. A: Chem., 257, 149, 2006) or in Robicki et al. (Robicki G., Rakoczy P., Parzuchowski P., in Green Chem., 7, 529, 2005) or in Ubaghs et al. (Ubaghs L., Fricke N., Keul H., Hôcker H., in Macromol. Rapid Comm., 25, 517, 2004), or in Komura et al. (Komura H., Yoshino T., Ishido Y., in Bulletin of the chemical society of Japan, 46, 550, 1973) or in Matsumoto et al. (Matsumoto K., Fuwa S., Shimojo M., Kitajima H., in Bull. Chem. Soc. Jpn, 69, 2977, 1996).

Polymerisation of carbonates was typically carried out by ring-opening of the five- or six-membered carbonates either by organometallic catalysis or by organic catalysis. The advantage of organometallic catalysis was that it offers a controlled polymerisation. The most frequently used catalytic components were based on

- $Sn(Oct)_2$ as described for example in Kricheldorf and Stricker (Kricheldorf H. R., Stricker A., in Macromol. Chem. Phys. 201, 2557, 2000)
- or biocompatible metals such as Mg, Ca, Fe or Zn as described for example in Darensbourg et al. (Darensbourg D., Wonsook C., Poulomi G., Casseday R., in Macromol. 37, 4374, 2006) or in Dobrzinsky et al. (Dobrzinsky P., Pastusiak M., Bero M., in J. Polym. Sci. Part A Polym. Chem., 43, 1913, 2004) or in Kuran et al. (Kuran W., Sobczak M., Listos T., Debek C., Florjanczyk Z., in Polymer. 41, 8531, 2000)
- or group 3 metal (including the lanthanide series) complexes such as described for example in Palard et al. (Palard I., Schappacher M., Belloncle B., Soum A., Guillaume S., in Chem. Eur. J. 13, 1511, 2007) or in Zhao et al. (Zhao B., Lu C., Shen Q., in J. Appl. Polym. Sci., 25, 517, 2004) or in Sheng et al. (Sheng H., Zhou L., Zhang Y., Yao Y., Shen Q., in J. Polym. Sci. Part A Polym. Chem., 45, 1210, 2007).

The advantage of organic catalysis was that it offered polymerisation under mild conditions with non-metal catalyst components. They were based on

- enzymes such as described for example in Bisht et al. (Bisht S. K., Svirkin Y. Y., Henderson L. A., Gross R. A., in Macromolecules, 30, 7735, 1997) or in Gross et al. (Gross R. A., Kumar A., Kalra B., in Chem. Rev., 101, 2109, 2001) or in Koboyashi et al. (Koboyashi S., Uyama H., Kimura S., in Chem. Rev. 101, 3793, 2001).
- organic compounds such as amines or guanidine as described for example in Nederberg et al. (Nederberg F., Lohmeijer G. B., Leibfarth F., Pratt R. C., Choi J., Dove A. P., Waymouth R. M., Heidrich J. L., in Biomacromolecules, 8, 153, 2007) or in Mindemark et al. (Mindemark J Hilborn J., Bowden T., in Macromolecules, 40, 3515, 2007).

It is an aim of the present invention to provide a method for polymerising cyclic carbonate compounds using small amounts of a metal catalyst.

It is another aim of the present invention to use, in combination with the small amounts of the metal catalyst, large amounts of a transfer agent to achieve so-called "immortal" polymerisation of cyclic carbonate compounds.

It is a further aim of the present invention to control and tune the characteristics and properties of the resulting polycarbonates.

In particular, it is another aim to prepare functionalised polycarbonates selectively end-capped by a group originating from the transfer agent.

It is yet another aim of the present invention to apply the method of the immortal ring-opening polymerisation to new cyclic carbonates derived from glycerol.

Any one of those aims is, at least partially, fulfilled by the present invention.

LIST OF FIGURES

Accordingly, the present invention discloses a process for polymerising five- or six-membered cyclic carbonates by ring-opening polymerisation in the presence of a system comprising an organometallic compound and an alcohol, characterised in that the number average molecular weight Mn of the final polymer is controlled by the ratio monomer/alcohol.

The method is very efficient to polymerise cyclic carbonates in a highly controlled manner using minute amounts of organometallic compound with a large excess of alcohol, under mild reaction conditions.

The alcohol is acting as co-activator and transfer agent. It is in a first role the initiator of the ring-opening and in a second role, a fast reversible exchange takes place between the growing polymer chains and the free alcohol moieties. Excess alcohol molecules, being involved in said rapid and reversible exchange with the growing chains thus appear to act as transfer agents.

The organometallic compound can be selected from metallic complexes of formula $MR_n$ wherein M is a metal Group 2, 3 (including the lanthanide series, hereafter referred as Ln), 8, 12 or 13 of the periodic Table, wherein each R is selected independently from hydrogen, an hydrocarbyl radical having from 1 to 12 carbon atoms, an alkoxide group OR* wherein R* is a linear or branched hydrocarbyl having from 1 to 12 carbon atoms, an amido group $NR^{}_2$ wherein R is of general formula $YR^{\#}_3$ wherein Y is Si or C and each R# is independently selected from hydrogen or hydrocarbyl having from 1 to 12 carbon atoms, a borohydride group or an halide, and wherein n is the valence of M.

Preferably, M is Mg(II), Ca(II), Y(III), Fe(II), Fe(III), Zn(II), or AI(III).

Preferably each R is selected independently from an amido group such as $N(SiMe_3)_2$, $N(SiHMe_2)_2$, an alkoxide group OR' such as OiPr, OMe, OBn, . . . , or a borohydride group $(BH_4)$ . . . .

The alcohol can be represented by formula R'OH wherein R' is an hydrocarbyl, linear or branched, having from 1 to 20 carbon atoms. Preferably R' is a secondary alkyl residue or benzylic group, more preferably it is isopropyl ($^i$Pr) or benzyl (Bn) or a combination thereof.

The polymerisation reaction can be represented by:

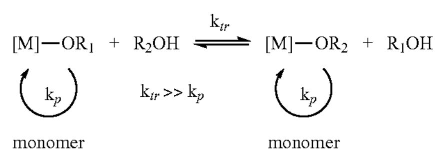

$R_1$, $R_2$=growing polymer chain; [M]: organometallic fragment $k_{tr}$: transfer rate constant; $k_p$: propagation rate constant In the present polymerisation scheme, alcohol acts as a reversible transfer agent. During chain propagation, a rapid alkoxide/alcohol exchange takes place. It is observed, for the first time for cyclic carbonate monomers, that, as the ratio alcohol/metal increases, the molecular weight of the polymer chains decreases to the same extent.

If the rate of transfer reaction $k_{tr}$ is rapid enough relative to the polymerisation rate $k_p$, the molar mass distribution of the macromolecules formed is narrow.

Figure 1:
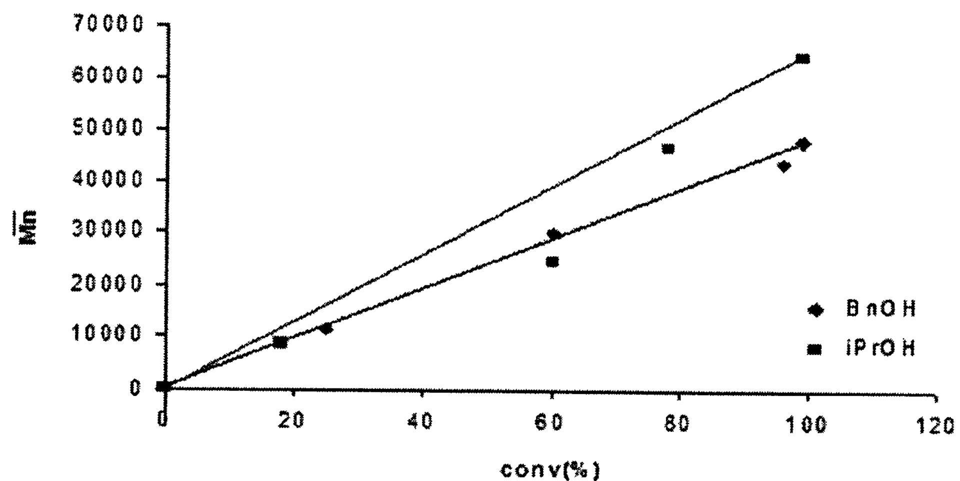
FIG. 1 represents the number average molecular weight Mn of poly(trimethylcarbonate) expressed in Da as a function of conversion rate expressed in % for two different alcohols, BnOH and $^i$PrOH respectively.

At a constant alcohol/metal ratio, the molecular weight of the polycarbonate depends upon the nature of the alcohol as can be seen in FIG. 1 representing the number average molecular weight Mn of poly(trimethylcarbonate.) as a function of conversion percentage for two different alcohols, BnOH and $^i$PrOH, respectively. It is also observed that the relationship is linear.

Figure 2:
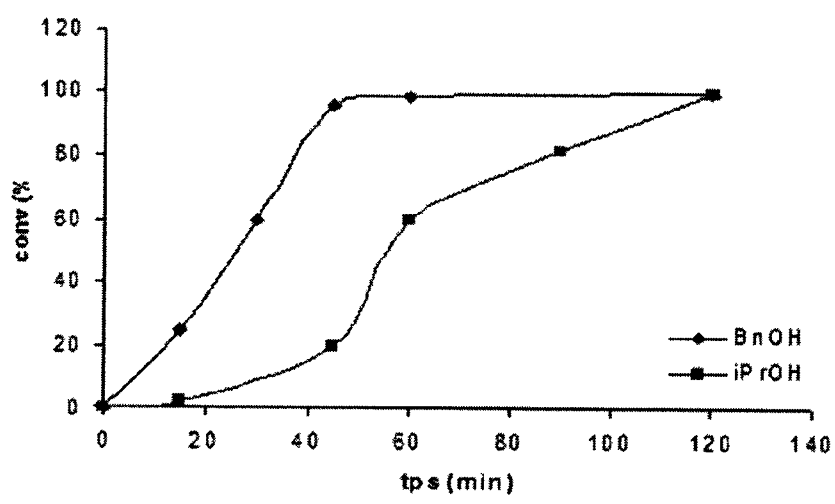
FIG. 2 represents the conversion of trimethylcarbonate expressed in % as a function of time expressed in minutes for two different alcohols, BnOH and $^i$PrOH respectively.

It is also observed that the nature of the alcohol has an influence on the activity of the system generated from $ZnEt_2$. More generally, we speculate that this might reflect the degree of aggregation (m) of the alkoxide-metal species $\{M(OR)_n\}_m$ generated from the combination of the $MR_n$ precursor and R'OH agent. This can be seen for example in FIG. 2 which represents the conversion percentage of trimethylenecarbonate as a function of time for two different alcohols, BnOH and $^i$PrOH, respectively. It can be seen that there is no induction period when BnOH is used as transfer agent whereas the catalytic system based on $^i$PrOH shows an important induction period of over 20 minutes.

In another embodiment according to the present invention the catalyst system used to start the ring-opening polymerisation of cyclic carbonates is a single-site catalyst component based upon a bulky β-diiminate ligands (BDI) as described by Coates et al. (B. M. Chamberlain, M. Cheng, D. R. Moore, T. M. Ovitt, E. B. Lobkovsky, and G. W. Coates, in J. Am. Chem. Soc., 2001, 123, 3229). It is represented by general formula

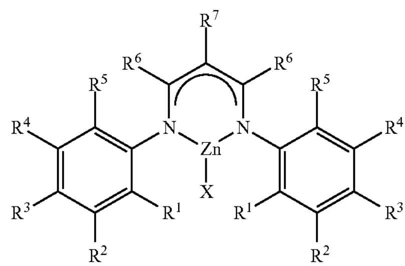

Wherein $R^1$, $R^2$, $R^3$, $R^4$, $R^5$, $R^6$ and $R^7$ are each independently selected from hydrogen, unsubstituted or substituted hydrocarbyl, or inert functional group and wherein two or more of said groups can be linked together to form one or more rings, wherein X is an hydrocarbyl radical having from 1 to 12 carbon atoms, an alkoxide group OR*, an amido group $NR^{**}_2$ or a borohydride group $(BH_4)$.

It is acting by a coordination/insertion mechanism.

Among the preferred catalytic compounds according to the present invention, one can cite $[BDI]Zn(N(SiMe_3)_2)$, $\{[BDI]Zn(OiPr),\}_2$, $Zn(N(SiMe_3)_2)$, $ZnEt_2$, $Y(N(SiMe_3)_2)$, "$Y(OiPr)_3$", and $Al(OiPr)_3$.

In these embodiments, the catalyst system also comprises an alcohol, as described above. This alcohol acts as an activator, eventually transforming in situ the catalyst precursor into an active metal-alkoxide species. Excess alcohol acts as transfer agent, transferring propagating polycarbonate chains from the active metal center to dormant hydroxy-capped polycarbonate chains. Accordingly, it is observed that the number average molecular weight increases when the ratio monomer/alcohol increases. The amount of alcohol is selected to obtain a ratio monomer/alcohol ranging between 25 and 25000, preferably between 200 and 2500.

This system allows transforming very large amounts of monomer with minute amounts of metal catalyst. The ratio monomer/metal is of from 1000 up to 100000.

Optionally, the alcohol can contain a functional group which will be selectively capping the terminus of each polycarbonate chain. This functional group can be used for various purposes. As non-limitating examples, one can cite:

a) vinyl end-groups which can promote further copolymerisation with other monomers;
b) nitroxide or alkoxyamine end-groups which can promote controlled radical polymerisation and/or ring-opening polymerisations,
c) fluorinated pony-tails.

Polymerisation can be carried out in bulk or in solution. Usual aromatic and aliphatic hydrocarbons can be used for that purpose.

Polymerisation is conducted at a temperature ranging from 20° C. to 180° C. preferably between 50 and 150° C. The pressure ranges from 0.5 to 20 atm, preferably it is 1 atm.

The polycarbonates thus prepared show typically a unimodal molecular weight distribution that ranges from 1.1 to 5.0, more typically from 1.5 to 2.5.

The number average molecular weight Mn can be tuned by the monomer-to-alcohol ratio and ranges from 1 000 to 1 000 000 g/mol, more typically from 10 000 to 250 000 g/mol.

This polymerisation process is operative for 5- to 7-membered cyclic carbonates. Preferably, this polymerisation process is operative for 6-membered cyclic carbonates.

As non-limitative examples, one can cite: trimethylenecarbonate (TMC), 2-benzyloxy-trimethylenecarbonate (BTMC), 2-hydroxy-trimethylenecarbonate (TMCOH), 4-(benzyloxymethyl)-1,3-dioxolan-2-one (BDMC), 4-(hydroxymethyl)-1,3-dioxolan-2-one (DMCOH).

In particular, one can cite new cyclic carbonates such as 2-oxy-trimethylenecarbonate (OTMC) and dehydrotrimethylenecarbonate (OHTMC).

TMC

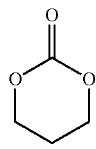

TMCOH

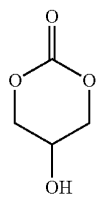

DHTMC

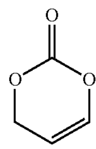

BDMC

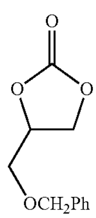

BTMC

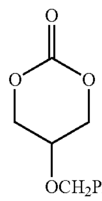

OTMC

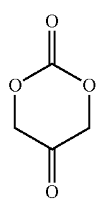

DMCOH

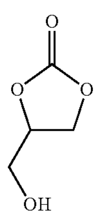

Copolymers resulting from any combinations of these monomers are also included in the present invention.

EXAMPLES

The polymerisation of trimethylenecarbonate (TMC) has been carried out with various catalyst components, alcohol initiators and polymerisation conditions.

Example 1

TMC was polymerised in the presence of diethylzinc ($ZnEt_2$) and an alcohol initiator

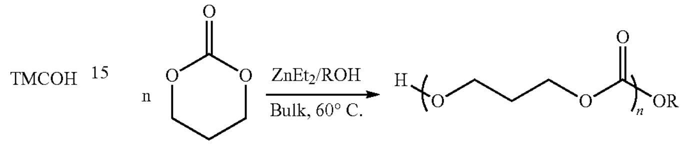

ROH.

Alcohol ROH was selected from $^{i}$PrOH or BnOH, the polymerisation temperature was of 60° C.

The polymerisation time and the ratio $TMC/ZnEt_2/ROH$ were varied as indicated in Table I.

The conversion rate expressed in %, the theoretical and experimental number average molecular weight and the polydispersity index D are disclosed in Table I.

The polydispersity index PI is determined by the ratio Mw/Mn of the weight average molecular weight Mw over the number average molecular weight Mn.

The theoretical number average molecular weight was calculated as $$Mn_{theo}=[TMC]/[BnOH]\times M_{TMC}\times conversion+M_{BnOH}$$

with $M_{TMC}$=102.9 g/mol, $M_{BnOH}$=108.14 and $M_{ipr}$=60.10 g/mol

TABLE I

| Alcohol | $TMC/ZnEt_2/ROH$ | Time min | Conv. % | $Mn_{theo}$ g/mol | $Mn_{exp}$ g/mol | PI |
|---|---|---|---|---|---|---|
| $^{i}$PrOH | 1000/1/2 | 120 | 99 | 51100 | 64400 | 1.65 |
| $^{i}$PrOH | 1000/1/5 | 150 | 100 | 20500 | 28500 | 1.75 |
| $^{i}$PrOH | 1000/1/10 | 150 | 100 | 10300 | 21000 | 1.56 |
| $^{i}$PrOH | 1000/1/20 | 130 | 100 | 5160 | 7600 | 1.3 |
| BnOH | 1000/1/2 | 60 | 99 | 50600 | 65200 | 1.68 |
| BnOH | 1000/1/5 | 60 | 100 | 20500 | 21100 | 1.74 |
| BnOH | 1000/1/10 | 60 | 100 | 10300 | 15000 | 1.48 |
| BnOH | 1000/1/20 | 60 | 100 | 5100 | 6500 | 1.28 |
| BnOH | 1000/1/50 | 150 | 90 | 1950 | 2600 | 1.15 |

The molecular weights Mn and Mw, and polydispersity index were determined by Size Exclusion Chromatography (SEC) in THF versus PS standards and corrected with a Mark-Houwink factor of 0.73.

There is an excellent correlation between the theoretical and the experimental (corrected) values of molecular weight Mn. It can be seen also that the molecular weight decreases when the ratio TMC/alcohol decreases, that is when the amount of alcohol increases.

Figure 3:
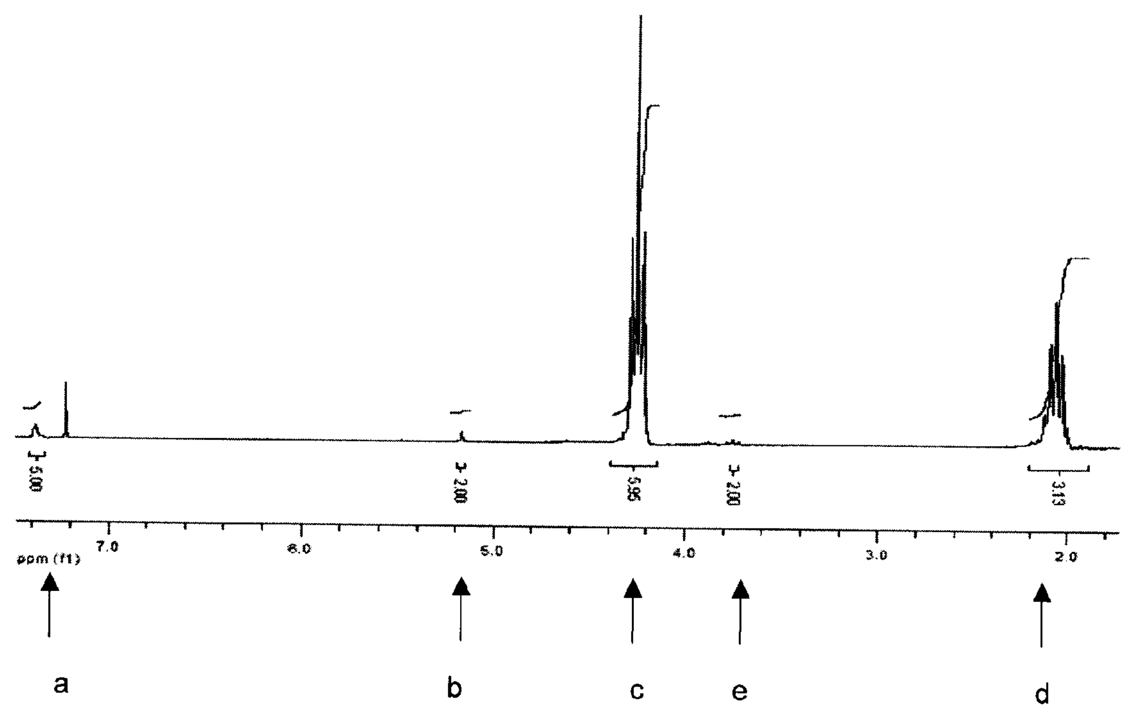
FIG. 3 represents the $^1$H NMR spectrum of the precipitated polymer prepared in example 1.
Figure 3:
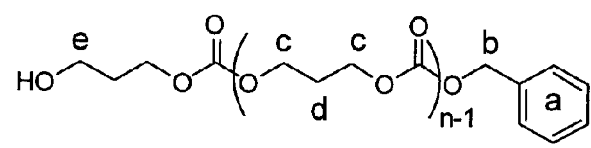

The $^{1}H$ NMR spectrum of the precipitated polymer can be seen in FIG. 3

Example 2

The polymerisation of trimethylene carbonate was carried out with β-diiminate-Zn-$[N(SiMe_3)_2]$ and an alcohol.

In a first step, β-diiminate-Zn$[N(SiMe_3)_2]$ was prepared according to a method developed by Coates et al. (B. M.

Chamberlain, M. Cheng, D. R. Moore, T. M. Ovitt, E. B. Lobkovsky, and G. W. Coates, in J. Am. Chem. Soc., 2001, 123, 3229).

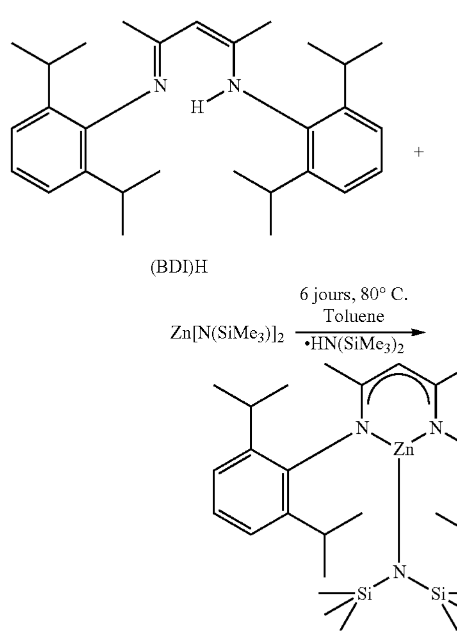

The polymerisation was then carried out according to the following scheme:

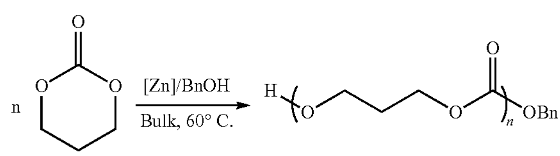

The alcohol used in all polymerisation experiments was BnOH and the temperature was of 60° C. to 110° C. The zinc complex and the alcohol were reacted under stirring prior to introduction of the monomer for a period of time of from 15 minutes to 180 minutes. In the absence of preliminary reaction, the observed molecular weight $M_n$ was much larger than the calculated Mn. The experimental conditions and results are displayed in Table II.

TABLE II

| TMC/ Zn/ROH | Temp (° C.) | Time min | Conv. % | $Mn_{theo}$ g/mol | $Mn_{RMN}$ g/mol | $Mn_{exp}$ g/mol | PI |
|---|---|---|---|---|---|---|---|
| 500/1/1 | 60 | 8 | 95 | 48600 | 46300 | 42000 | 1.7 |
| 500/1/2 | 60 | 8 | 100 | 25600 | 30250 | 27700 | 1.65 |
| 500/1/5 | 60 | 7 | 99 | 10200 | 10400 | 12400 | 1.55 |
| 500/1/10 | 60 | 30 | 100 | 5200 | 5750 | 7300 | 1.38 |
| 500/1/20 | 60 | 60 | 99 | 2600 | 2800 | 3500 | 1.35 |
| 1000/1/5 | 60 | 10 | 100 | 2040 | 25600 | 25900 | 1.6 |
| 1000/1/50 | 60 | 20 | 89 | 1920 | 1990 | 2200 | 1.17 |
| 2000/1/5 | 60 | 15 | 79 | 32200 | nd | 35700 | 1.9 |
| 2000/1/20 | 60 | 30 | 95 | 9800 | 11000 | 13100 | 1.38 |
| 5 000/1/20 | 60 | 75 | 90 | 23 060 | nd | 28 760 | 1.70 |
| 10 000/1/20 | 60 | 180 | 89 | 45 500 | nd | 45 900 | 1.67 |
| 25000/1/5 | 110 | 40 | 80 | 408470 | nd | 190000 | 1.70 |
| 25000/1/10 | 110 | 40 | 83 | 211940 | nd | 185200 | 1.63 |
| 25 000/1/20 | 60 | 900 | 75 | 95 820 | nd | 93 440 | 1.65 |
| 25 000/1/20 | 110 | 30 | 73 | 93 190 | nd | 102 200 | 1.69 |

TABLE II-continued

| TMC/ Zn/ROH | Temp (° C.) | Time min | Conv. % | $Mn_{theo}$ g/mol | $Mn_{RMN}$ g/mol | $Mn_{exp}$ g/mol | PI |
|---|---|---|---|---|---|---|---|
| 25 000/1/20 | 110 | 50 | 96 | 122 500 | nd | 110 230 | 1.84 |
| 25000/1/50 | 110 | 40 | 80 | 40945 | nd | 50300 | 1.88 |
| 50 000/1/20 | 110 | 120 | 93 | 237 150 | nd | 160 600 | 1.68 |

it can be seen that, in this example also, the number average molecular weight Mn increases with increasing ratio monomer/alcohol.

Minute amounts of zinc, as low as 20 ppm versus the monomer, can be used to convert up to 50,000 equiv. of TMC within short reaction time periods.

Example 3

The polymerisation of trimethylenecarbonate was carried out with aluminium tris(isopropoxide) $Al(O^iPr)_3$ at a temperature of 60 or 110° C. with and without alcohol, as indicated in table III.

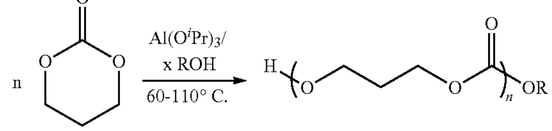

The experimental conditions and results are displayed in Table III.

TABLE III

| Alcohol | TMC/Al/ ROH | T ° C. | Time min | Conv. % | $Mn_{theo}$ g/mol | $Mn_{RMN}$ g/mol | PI |
|---|---|---|---|---|---|---|---|
| — | 1500/1/0 | 60 | 60 | 5 | 2500 | nd | nd |
| — | 1500/1/0 | 60 | 120 | 26 | 13300 | nd | nd |
| — | 500/1/0 | 110 | 5 | 70 | 17000 | 124000 | 1.66 |
| — | 500/1/0 | 110 | 10 | 100 | 17000 | 118000 | 1.63 |
| — | 500/1/0 | 110 | 10 | 100 | 17000 | 119000 | 1.66 |
| — | 500/1/0 | 110 | 20 | 100 | 17000 | 95100 | 1.89 |
| $^i$PrOH | 500/1/5 | 110 | 10 | 100 | 10260 | 15700 | 1.4 |
| BnOH | 500/1/5 | 110 | 10 | 100 | 10300 | 11300 | 1.47 |
| BnOH | 2000/1/20 | 110 | 30 | 99 | 10200 | 12800 | 1.38 |

In the absence of alcohol, there is no correlation between the observed and calculated molecular weight Mn and the activity is very low. It can be concluded that the catalyst component is modified by the addition of alcohol.

Comparing the different catalyst systems used in the polymerisation of carbonates, the following conclusions can be derived.

In the reaction

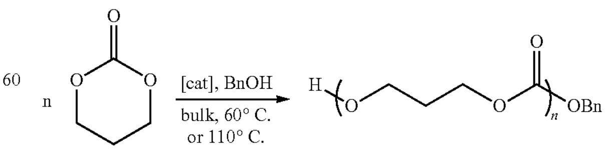

wherein [cat] was either $Al(iPrO)_3$ or $(BDI)Zn[N(SiMe_3)_2]$ and thus wherein a different metal was used wherein TMC/(Zn or Al)/BnOH=2000/1/20 similar results were observed in terms of conversion rate (95%), molecular weight $M_n$ (12000), and polydispersity index (1.38), but the polymerisation temperature was much higher for Al than for Zn. Zinc is thus more active than aluminium.

In the reaction

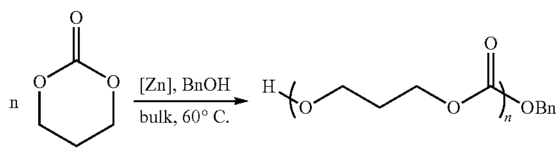

wherein the same metal was used, but in different metallic compounds, $ZnEt_2$ and $(BDI)Zn[N(SiMe_3)_2]$ respectively, wherein the ratio TMC/Zn/BnOH=1000/1/50 similar results were obtained in terms of conversion rate (90%), molecular weight $M_n$ (2000) and polydispersity index (1.15)

but polymerisation with $(BDI)Zn[N(SiMe_3)_2]$ occurred much faster than with $ZnEt_2$, 20 minutes vs 150 minutes respectively.

In the reaction

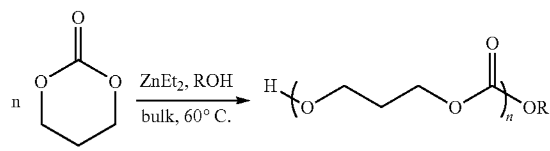

wherein the metallic compound is $ZnEt_2$, wherein the polymerisation temperature is of 60° C., and wherein the ration TCM/Zn/ROH=1000/1/2, but wherein different alcohols are used, BnOH vs $^i$PrOH similar results are observed in terms of conversion rate (99%), molecular weight $M_n$, (64400) and polydispersity index (1.65), but the polymerisation time is shorter for BnOH than for $^i$PrOH, 60 minutes vs 120 minutes respectively.

It was further observed that the conversion rate increased with increasing temperature.

The invention claimed is:

1. A process for polymerising five- or six-membered cyclic carbonates to prepare homo- or co-polymers of carbonate by ring-opening polymerisation in the presence of a system comprising an organometallic compound and alcohol, wherein a ratio of monomer/metal ranges between 1000 and 100,000, wherein a number average molecular weight Mn of the final polymer increases with increasing monomer/alcohol ratio, and wherein the carbonate is a five- or six-membered cyclic carbonate selected from 2-oxy-trimethylenecarbonate (OTMC) or dehydrotrimethylenecarbonate (DHTMC).

2. The process of claim 1, wherein the organometallic compound is selected from metallic complexes of formula $MR_n$ wherein M is a metal Group 2, 3 (including the lanthanide series), 8, 12 or 13 of the periodic Table, wherein each R is selected independently from hydrogen, a linear or branched hydrocarbyl radical having from 1 to 12 carbon atoms, an alkoxide group OR* wherein R* is a linear or branched hydrocarbyl having from 1 to 12 carbon atoms, an amido group $NR^{}_2$ wherein each R is independently of general formula $YR^{\#}_3$ wherein Y is Si or C and each $R^{\#}$ is independently selected from hydrogen or hydrocarbyl having from 1 to 12 carbon atoms, a borohydride group or an halide, and wherein n is the valence of M.

3. The process of claim 2, wherein M is Mg(II), Ca(II), Y(III), Fe(II), Fe(III), Zn(II), or Al(III).

4. The process of claim 2, wherein each R is selected independently from an amido group, an alkoxide group OR', or a borohydride group ($BH_4$).

5. The process of claim 1, wherein the organometallic compound is a single-site catalyst component based upon a bulky β-diiminate ligand (BDI) represented by general formula

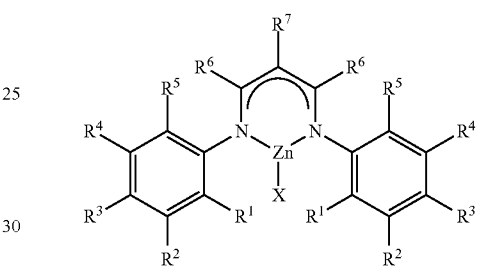

wherein $R^1$, $R^2$, $R^3$, $R^4$, $R^5$, $R^6$ and $R^7$ are each independently selected from hydrogen, unsubstituted or substituted hydrocarbyl, or inert functional group, wherein two or more of said groups can be linked together to form one or more rings, wherein X is an hydrocarbyl radical having from 1 to 12 carbon atoms, an alkoxide group OR*, an amido group $NR^{**}_2$ or a borohydride group ($BH_4$).

6. The process of claim 1, wherein the organometallic compound is selected from [BDI]Zn(N(SiMe3)2), {[BDI]Zn (OiPr),}2, Zn(N(SiMe3)2), ZnEt2, Y(N(SiMe3)2), Y(OiPr)3, and Al(OiPr)3.

7. The process of claim 1, wherein the alcohol is R'OH wherein R' is an hydrocarbyl, linear or branched, having from 1 to 20 carbon atoms and wherein the monomer/alcohol ratio is of from 25 to 2500.

8. The process of claim 1, wherein the alcohol is isopropyl (iPr) or benzyl (Bn).

9. The process of claim 1, wherein the alcohol additionally contains a functional group that is capping the end of each polycarbonate chain.

10. The process of claim 1, wherein the amount of metal catalyst is selected to obtain a ratio of monomer/metal of from 1000 to 10000.

* * * * *